United States Patent
Cho et al.

(10) Patent No.: US 9,055,418 B2
(45) Date of Patent: Jun. 9, 2015

(54) METHOD AND SYSTEM FOR DELIVERING SMS (SHORT MESSAGE SERVICE) MESSAGES IN A MOBILE COMMUNICATION SYSTEM

(75) Inventors: Song-yean Cho, Seoul (KR);
Soeng-Hun Kim, Suwon-si (KR);
Sung-Ho Choi, Suwon-si (KR);
Beom-Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 13/695,759

(22) PCT Filed: Apr. 29, 2011

(86) PCT No.: PCT/KR2011/003244
§ 371 (c)(1),
(2), (4) Date: Nov. 1, 2012

(87) PCT Pub. No.: WO2011/139056
PCT Pub. Date: Nov. 10, 2011

(65) Prior Publication Data
US 2013/0095796 A1    Apr. 18, 2013

(30) Foreign Application Priority Data
May 3, 2010    (KR) .................... 10-2010-0041602

(51) Int. Cl.
*H04W 4/00* (2009.01)
*H04W 4/14* (2009.01)
(Continued)

(52) U.S. Cl.
CPC ............... *H04W 4/14* (2013.01); *H04W 88/08* (2013.01); *H04W 72/0406* (2013.01); *H04L 63/162* (2013.01); *H04W 12/02* (2013.01)

(58) Field of Classification Search
CPC ......... H04W 8/16; H04W 8/24; H04W 12/00; H04W 12/02; H04W 12/04; H04W 12/08; H04W 48/02

USPC .............. 455/411, 432.1, 432.3, 433, 435.1, 455/435.2, 561, 436, 434, 450; 370/329
See application file for complete search history.

(56) References Cited

U.S. PATENT DOCUMENTS 8,588,745 B2 * 11/2013 Gupta et al. .................. 455/411
2009/0052388 A1 * 2/2009 Kim et al. ..................... 370/329
(Continued)

FOREIGN PATENT DOCUMENTS

| CN | 101669377 A | 3/2010 |
|---|---|---|
| KR | 10-2010-0021384 A | 2/2010 |

(Continued)

OTHER PUBLICATIONS

NEC, UE-EPC Signalling Setup: S1AP corrections, 3GPP TSG-RAN WG3 # 61 bis, R3-082691, XP050323959, Sep. 24, 2008, pp. 2, 4, Prague, Czech Republic.
(Continued)

*Primary Examiner* — Amancio Gonzalez
(74) *Attorney, Agent, or Firm* — Jefferson IP Law, LLP

(57) ABSTRACT

A method and system for delivering data are provided. The method includes sending, by a User Equipment (UE), to an evolved Node-B (eNB) a service request message for requesting data when setting up Radio Resource Control (RRC) connection using a RRC connection complete message, sending, by the eNB, the received service request message to a Mobile Management Entity (MME) using an initial UE message, sending, by the MME, an 'initial context setup for signaling' message that does not include information about data bearers, to the eNB, upon receiving the initial context setup message, setting up, by the eNB, Access Stratum (AS) security with the originating UE and performing, by the originating UE, Non Access Stratum (NAS) security with the MME, and upon completion of the NAS security process with the MME, transmitting, by the originating UE, the data to the MME using an uplink NAS transport message.

10 Claims, 14 Drawing Sheets

(51) Int. Cl.
*H04W 72/04* (2009.01)
*H04W 12/02* (2009.01)
*H04W 88/08* (2009.01)
*H04L 29/06* (2006.01)

(56) References Cited

U.S. PATENT DOCUMENTS

2011/0105119 A1* 5/2011 Bienas et al. ............ 455/436
2012/0033565 A1 2/2012 Suh et al.

FOREIGN PATENT DOCUMENTS

| KR | 10-2010-0021690 A | 2/2010 |
|---|---|---|
| KR | 10-2010-0038563 A | 4/2010 |
| WO | 2010/018801 A1 | 2/2010 |
| WO | 2010/025280 A2 | 3/2010 |

OTHER PUBLICATIONS

3rd Generation Partnership Project; Technical Specification Group Core Network and Terminals; Non-Access-Stratum (NAS) protocol for Evolved Packet System (EPS); Stage 3 (Release 8), 3GPP TS 24.301, V8.5.0, XP050402198, Mar. 31, 2010, sections 4.4.4.1, 8.2. 25, Sophia-Antipolis, France.

* cited by examiner

METHOD AND SYSTEM FOR DELIVERING SMS (SHORT MESSAGE SERVICE) MESSAGES IN A MOBILE COMMUNICATION SYSTEM

PRIORITY

This application is a National Phase Entry of PCT International Application No. PCT/KR2011/003244, which was filed on Apr. 29, 2011, and claims priority to Korean Patent Application Nos. 10-2010-0041602, filed in Korea Patent Office on May 3, 2010, the contents are incorporated herein by reference.

BACKGROUND OF THE INVENTION

1. Field of the Invention

The present invention relates to a method and system for delivering Short Message Service (SMS) messages in a mobile communication system.

2. Description of the Related Art

Generally, SMS, a value-added service in mobile communication systems, refers to a service of sending short texts to the other party. At present, mobile communication systems such as Long Term Evolution (LTE) use a Circuit Switched Fall Back (CSFB) function that uses the Mobile Switching Center (MSC) existing in the legacy network. In terms of the delivery overhead, quite a lot of control messages are required to support a User Equipment (UE) in an idle state in sending one SMS message which is limited to 160 characters.

SUMMARY OF THE INVENTION

The present invention provides a method and system for efficiently providing an SMS service in an LTE system.

The present invention provides a method and system for reducing a load during an SMS service in an LTE system.

In accordance with one aspect of an embodiment of the present invention, there is provided a method for delivering a Short Message Service (SMS) message in a mobile communication system, the method including sending, by an SMS originating User Equipment (UE), to an evolved Node-B (eNB) a service request message for requesting SMS sending in a process of setting up RRC connection using a Radio Resource Control (RRC) connection complete message; sending, by the eNB, the received service request message to a Mobile Management Entity (MME) using an initial UE message; sending, by the MME, an 'initial context setup for signaling' message that does not include information about data bearers, to the eNB in response to the initial UE message; upon receiving the initial context setup message, setting up, by the eNB, Access Stratum (AS) security with the SMS originating UE; if AS security is set up, performing, by the SMS originating UE, Non Access Stratum (NAS) security with the MME; and upon completion of the NAS security process with the MME, transmitting, by the SMS originating UE, the SMS message to the MME using an uplink NAS transport message.

In accordance with another aspect of an embodiment of the present invention, there is provided a method for delivering a Short Message Service (SMS) message in a mobile communication system, the method including sending, by an SMS originating User Equipment (UE), to an evolved Node-B (eNB) a service request message for requesting SMS sending in a process of setting up RRC connection using a Radio Resource Control (RRC) connection complete message; sending, by the eNB, the received service request message to a Mobile Management Entity (MME) using an initial UE message; sending, by the MME, an initial UE message response message comprising information for Non Access Stratum (NAS) security setup to the eNB in response to the initial UE message; sending, by the eNB, an accept message with respect to the service request message to the SMS originating UE through downlink transmission; and upon receiving the accept message, sending, by the SMS originating UE, an SMS message to the MME using an uplink NAS transport message.

In accordance with further another aspect of an embodiment of the present invention, there is provided a method for delivering a Short Message Service (SMS) message in a mobile communication system, the method including activating, by an SMS originating User Equipment (UE), Non Access Stratum (NAS) security after receiving a Radio Resource Control (RRC) connection setup message from an evolved Node-B (eNB) in a process of setting up an RRC connection with the eNB; after the NAS security is activated, sending a service request message comprising an SMS message encrypted using an encryption key in security context of the activated NAS security and an indicator indicating SMS sending-only to the eNB using an RRC connection complete message; upon receiving the service request message, sending, by the eNB, an initial UE message comprising the service request message and a temporary identifier (eNB UE S1AP id) which the eNB allocates to identify the SMS originating UE to a Mobile Management Entity (MME); if the service request message is valid, decrypting, by the MME, an SMS message included in the service request message using the encryption key; and sending, by the MME, the decrypted SMS message to an SMS terminating UE via a Mobile Switching Center (MSC).

In accordance with still another aspect of an embodiment of the present invention, there is provided a system for delivering a Short Message Service (SMS) message in a mobile communication system, the system including an SMS originating User Equipment (UE) for sending a service request message for requesting SMS sending in a process of setting up RRC connection using a Radio Resource Control (RRC) connection complete message; an evolved Node-B (eNB) for sending the service request message included in the RRC message using an initial UE message, if receiving the RRC connection complete message when setting up the RRC connection with the SMS originating UE; and a Mobile Management Entity (MME) for sending an 'initial context setup for signaling' message which does not comprise information about data bearers to the eNB, if receiving the initial UE message from the eNB, in which the eNB, if receiving the initial context setup message, sets up Access Stratum (AS) security with the SMS originating UE, and if the AS security is set up, the SMS originating UE performs Non Access Stratum (NAS) security with the MME, and upon completion of the NAS security process with the MME, the SMS originating UE sends an SMS message to the MME using an uplink NAS transport message.

In accordance with yet another aspect of an embodiment of the present invention, there is provided a system for delivering a Short Message Service (SMS) message in a mobile communication system, the system including an SMS originating User Equipment (UE) for sending a service request message for requesting SMS sending in a process of setting up RRC connection using a Radio Resource Control (RRC) connection complete message; an evolved Node-B (eNB) for sending in response to the initial UE message, using an initial UE message, the service request message received when setting up the RRC connection with the SMS originating UE;

and a Mobile Management Entity (MME) for sending an initial UE message response message comprising information for setting up Non Access Stratum (NAS) security to the eNB in response to the initial UE message, if receiving the initial UE message from the eNB, in which the eNB sends an accept message with respect to the service request message to the SMS originating UE through downlink transmission, and the SMS originating UE having received the accept message sends an SMS message to the MME using an uplink NAS transport message.

According to the present invention, loads of a UE and an eNB, for SMS delivery, may be reduced in the evolved mobile communication systems.

DETAILED DESCRIPTION OF EXEMPLARY EMBODIMENTS

Figure 1A:
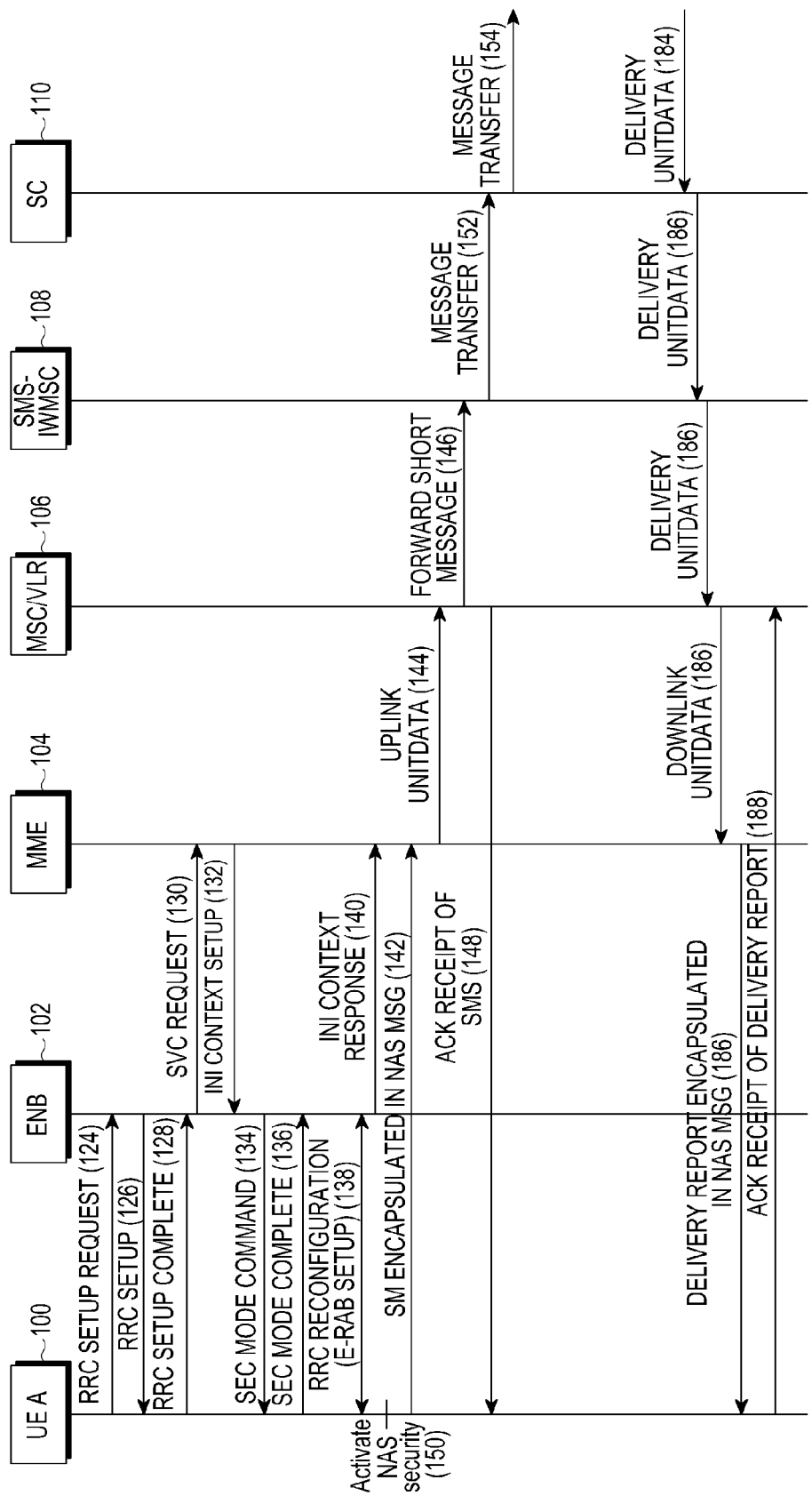
FIG. 1 is an end-to-end signal flow diagram of sending an SMS message from an idle UE A to an idle UE B in an LTE system to which the present invention is applied.

Preferred embodiments of the present invention will be described in detail below with reference to the accompanying drawings. The same reference numerals are used throughout the drawings to refer to the same or like elements of embodiments of the present invention.

In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

In an LTE system to which the present invention is applied, in order to determine the amount of actual overload for SMS provision in terms of the entire system, an end-to-end signal flow diagram of sending one SMS message from a UE A in an idle state to a UE B in an idle state may be analyzed as shown in FIG. 1.

Figure 1B:
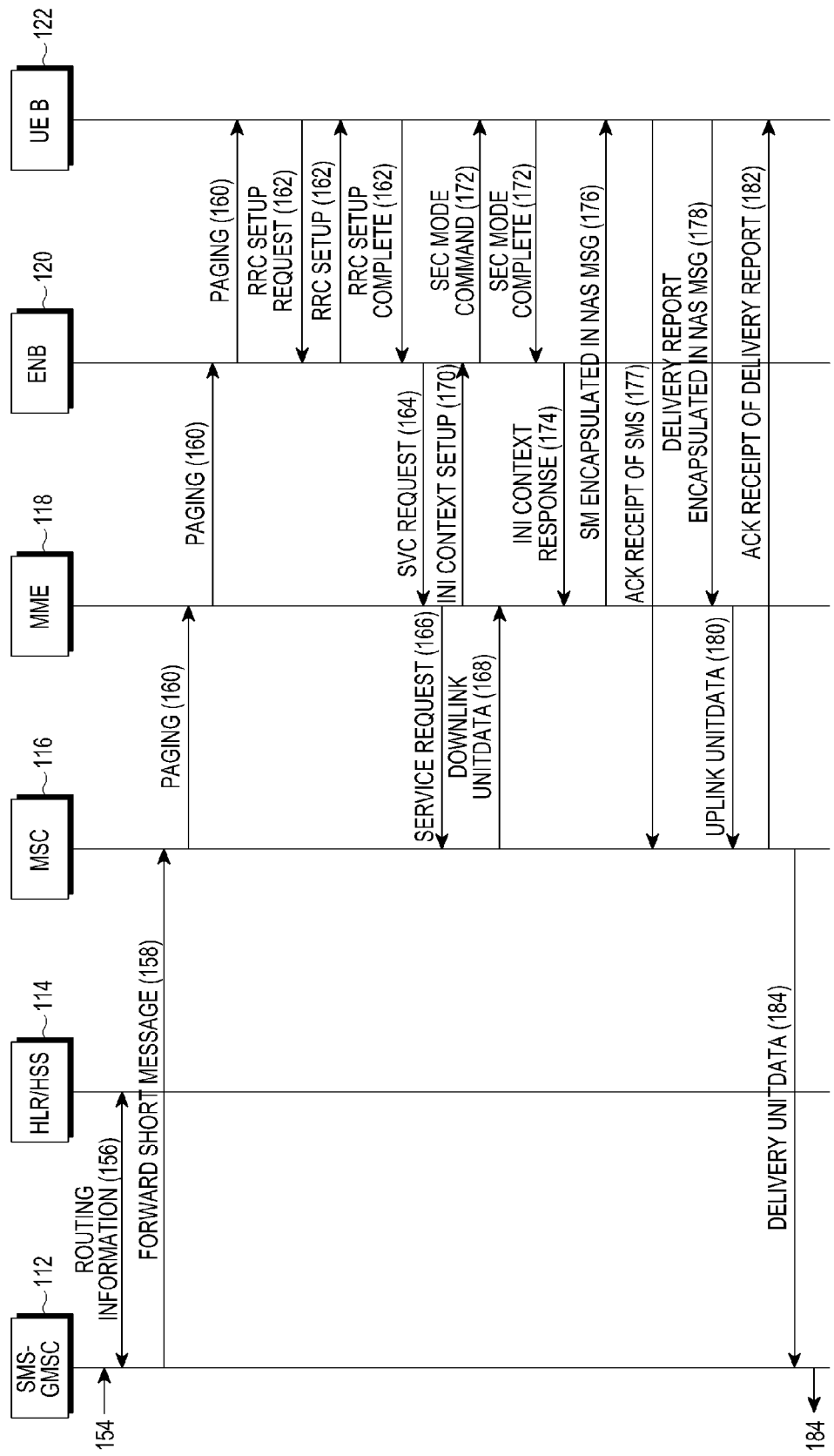

FIG. 1 is an end-to-end signal flow diagram of sending an SMS message from an idle UE A 100 to an idle UE B 122 in an LTE system to which the present invention is applied. For convenience' sake, FIG. 1 is divided into FIG. 1A and FIG. 1B.

In step 124, the UE A 100 in an idle state sends a Radio Resource Control (RRC) setup request message for making an RRC connection to an evolved Node-B (eNB) 102, to send an SMS message.

Upon receiving the RRC setup request message from the UE A 100 in step 124, the eNB 102 allocates a signal radio bearer and sends an RRC setup message including the allocation information to the UE A 100, in step 126.

Upon receiving the RRC setup message in step 126, the UE A 100 sends a service request message for a connection with a Mobile Management Entity (MME) 104 to the eNB 102 using an RRC setup complete message in order to send an SMS message, in step 128.

Upon receiving the RRC setup complete message in step 128, the eNB 102 sends a service (SVC) request message that the UE A 100 sends to the MME 104, using an initial UE message, in step 130. The eNB 102 allocates eNB S1AP id, which is a temporary id for identifying a message from the UE A 100, and then includes the temporary id in the initial UE message.

Upon receiving the initial UE message including the service request message from the UE A 100 in step 130, the MME 104 activates a security context between the UE A 100 and the MME 104, which it created according to an authentication procedure that it performed before the UE A 100 was in an idle state, and generates an Access Stratum (AS) security key used between the UE A 100 and the eNB 102, based on a Non Access Stratum (NAS) security key in this context, in step 132. The MME 104 activates a non-GBR bearer that the UE A 100 was using before it transitions to an idle state. In step 132, the MME 104 includes the generated AS security key, information about non-GBR bearers to be activated, and MME S1 AP id, which is a temporary id allocated by the MME 104, in an initial context setup message that the MME 104 sends to the eNB 102, and sends the initial context setup message to the eNB 102.

Upon receiving the initial context setup message in step 132, the eNB 102 sends an AS security command message to the UE A 100 based on the AS security key included in the received message, in step 134. In step 136, the eNB 102 receives a response thereto and activates AS security. In step 138, the eNB 102 activates radio bearers by performing RRC reconfiguration on the bearers to be activated.

If activation of radio bearers is successful, the UE A 100 activates NAS layer security in step 150, interpreting it as an implicit signal implying that the MME 104 has accepted the service request from the UE A 100 (AS layer security is activated in step 136).

If activation of radio bearers is successful, the eNB 102 notifies it to the MME 104 using an initial context setup response message in step 140.

In step 142, the UE A 100 sends an SMS message using the activated NAS key. (a NAS message is sent in an AS layer using a UL NAS transport, and is sent even in S1AP between the eNB 102 and the MME 104 using the UL NAS transport).

Upon receiving the SMS message from the UE A 100 in step 142, the MME 104 sends it to an MSC/Visitor Location Register (VLR) 106 in step 144.

In step 148, the MSC/VLR 106 sends ACK indicating its reception of the SMS message to the UE A 100 to prevent the UE A 100 from retransmitting the SMS message. In step 146, the MSC/VLR 106 forwards the SMS message to an SMS-Interworking MSC (IWMSC) 108 to send the SMS message to an SMS recipient (UE B 122).

In step 152, the SMS-IWMSC 108 sends the SMS message to an SMS Center (SC) 110.

In step 154, the SC 110 sends the received SMS message to a SMS-Gateway Mobile Switching Center (GMSC) 112.

In step 156, the SMS-GMSC 112 finds out routing information for an SMS receiving side (UE B 122), i.e., information about an MSC that can send an SMS message to the receiving side, via a Home Location Register/Home Subscribe Server (HLR/HSS) 114.

In step 158, the SMS-GMSC 112 forwards the SMS message to a receiving side-related MSC 116. In step 160, if the UE B 122, or an SMS receiving (or terminating) UE, is in an idle state, the MSC 116 sends a paging to the UE B 122 via an MME 118 and an eNB 120, in order to switch the UE B 122 to an active state.

Upon receiving the paging in step 160, the UE B 122 establishes an RRC connection with the eNB 120 and sends a service request message for responding to the paging to the eNB 120 in step 162, in order to respond to the paging.

In step 164, the eNB 120 sends a service (SVC) request message from the UE B 122 to the MME 118 using an initial UE message.

After receiving the service request message, the MME 118 sends the service request message to the MSC 116 to the MSC 116 in step 166 in order to receive from the MSC 116 the SMS message to be delivered to the UE B 122. Upon receiving the service request message from the MME 118, the MSC 116 sends the SMS message to the MME 118 through downlink unit data in step 168.

In step 170, the MME 118 sends an initial UE context setup request message to the eNB 120 in order to perform AS security and non-GBR bearer activation for the UE B 122 that sent the service request message in step 162. Upon receiving the initial UE context setup request message in step 170, the eNB 120 activates AS security by sending and receiving security mode command/complete messages, and activates non-GEBR bearers using an RRC reconfiguration/complete message, in step 172.

If activation of radio bearers is successful, the UE B 122 activates NAS layer security, interpreting it as an implicit signal implying that the MME 118 has accepted the service request message from the UE B 122 (AS layer security is activated in step 172). In step 174, if activation of radio bearers is successful, the eNB 120 notifies it to the MME 118 using an initial context setup response message. In step 176, the MME 118 encrypts the SMS message received from the MSC 116 using the activated NAS security, attaches MAC for integrity check thereto, and then delivers the resulting SMS message to the UE B 122 using a NAS message.

Upon receiving the SMS message in step 176, the UE B 122 sends ACK indicating its reception of the SMS message to the MSC 116 via the MME 118 in step 177 in order to prevent the MSC 116 from retransmitting the SMS message.

After receiving the SMS message, the UE B 122 sends a delivery report message, which it sends to the SC 110, to the MSC 116 via the MME 118 in steps 178 and 180. In step 182, the MSC 116 sends ACK indicating its reception of the delivery report message to the UE B 122 via the MME 118.

The delivery report message, sent by the UE B 122 or a SMS receiving UE, is sent by the MSC 116 to the SC 110 via the SMS-GMSC 112 in step 184.

In step 186, the SC 110 sends the received delivery report message to the UE A 100, which is a UE that has sent the SMS message, via the SMS-IWMSC 108, the MSC/VLR 106, and the MME 104.

Upon receiving the delivery report message in step 186, the UE A 100 or an SMS sending (or originating) terminal sends ACK, which is a response to the delivery report message, to the MSC/VLR 106 in step 188.

In the above-described process of FIG. 1, in which Message Origination (MO) and delivery report for SMS sending are processed, an SMS message is received once at the SC 110 that relays SMS messages, an SMS message is sent once by the SC 110, a report on SMS delivery is received once at the SC 110, and a report on SMS delivery is sent once by the SC 110, so the SC 110 receives a total of two messages and sends a total of two messages. The MSCs 106 and 116 receive a total of three messages and send a total of three messages. However, the SMS sending/receiving terminals 100 and 122, and the eNBs 102 and 120 each send a total of six messages and receive a total of six messages, and the MME 118 sends a total of four messages and receives a total of four messages. The number of messages sent and received by/at each UE and each network entity is listed in Table 1 below, showing that when SMS messages are sent and received using the CSFB function, most of the load is concentrated on the UEs, the eNBs and the MMEs.

TABLE 1

|        | UE | eNB | MME | MSC | SC |
|--------|----|-----|-----|-----|----|
| MSG Tx | 6  | 9   | 5   | 3   | 2  |
| MSG Rx | 5  | 9   | 6   | 3   | 2  |

The present invention provides the following embodiments for reducing the loads of UEs and eNBs during SMS delivery in a mobile communication system such as LTE, to which the present invention is applied, like Table 1.

First Embodiment

A first embodiment of the present invention corresponds to a method in which if a UE 200 sends only SMS messages, no data bearer is set up between the UE 200 and an eNB 202.

Figure 2A:
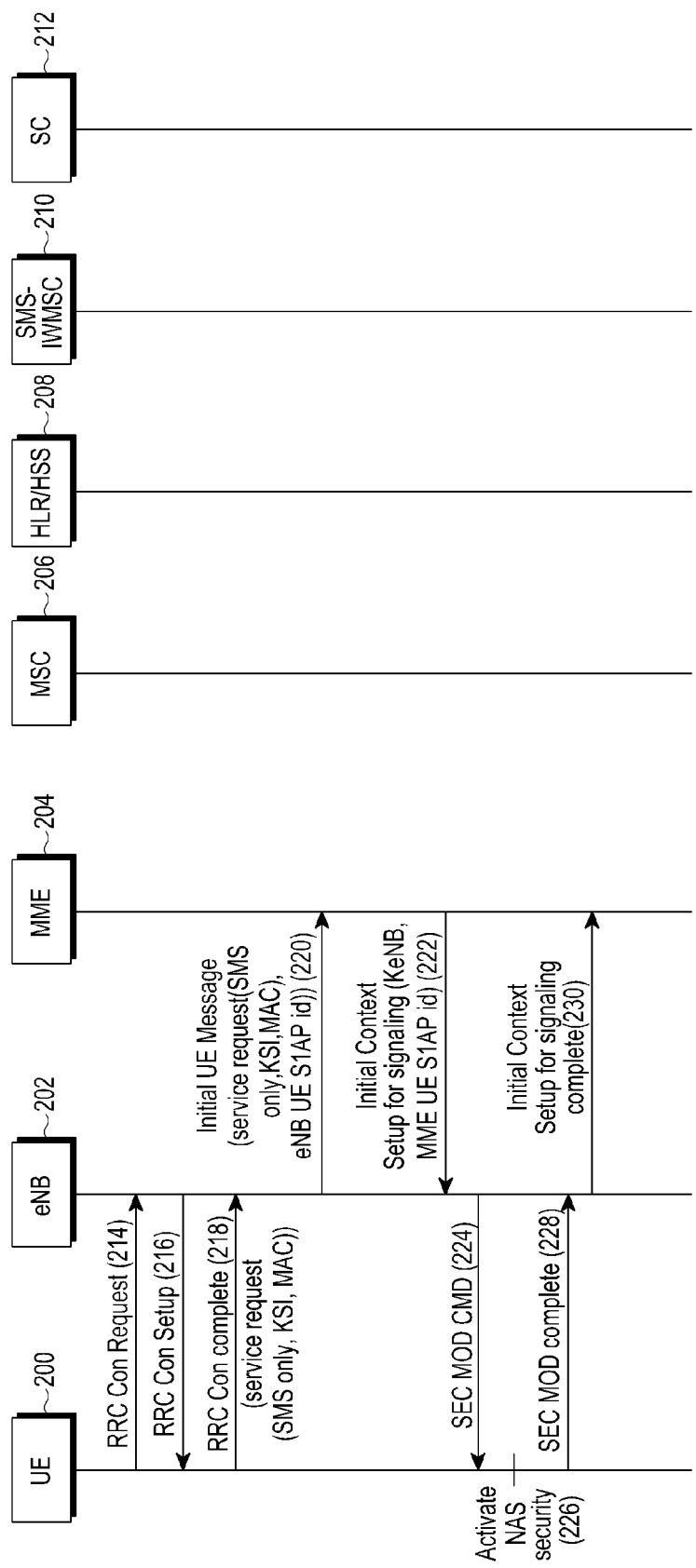
FIG. 2 is a signal flow diagram of processing a Message Origination (MO) call during SMS sending according to a first embodiment of the present invention.
Figure 2B:
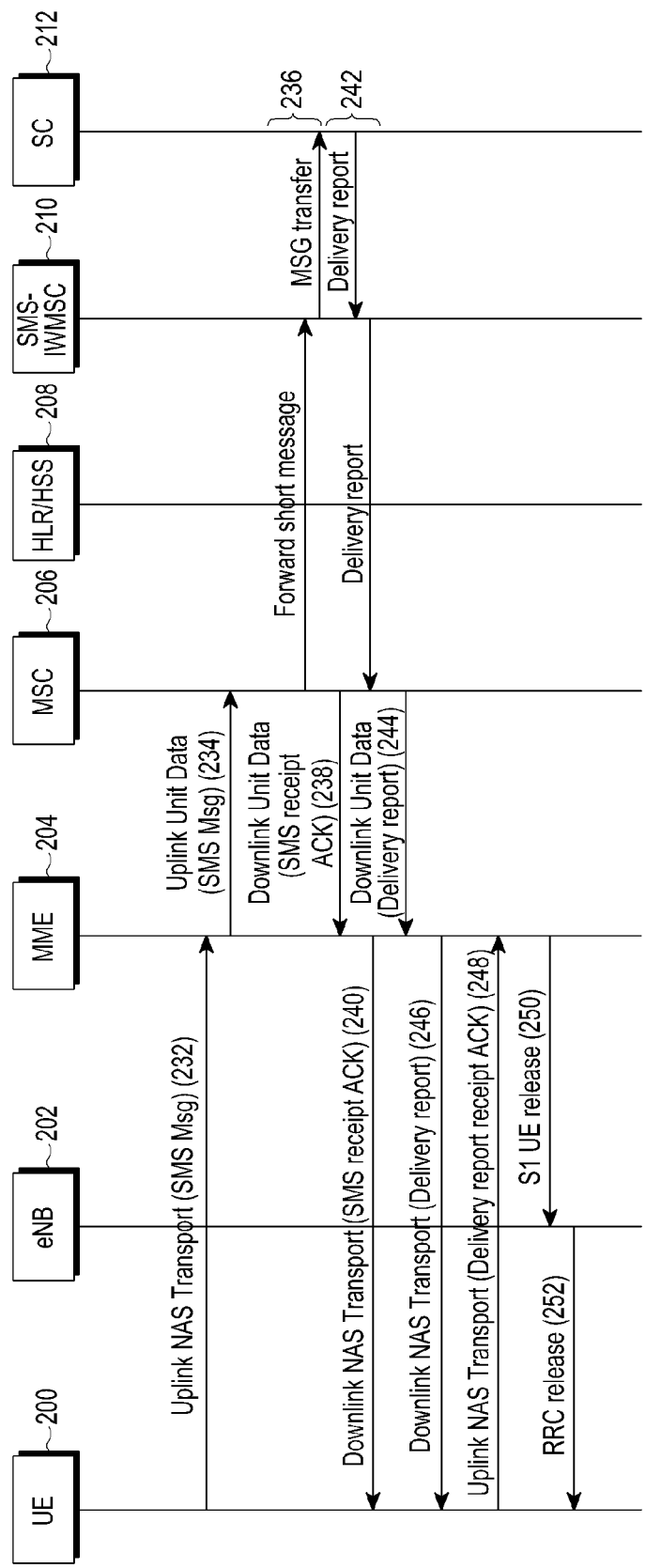

FIG. 2 is a signal flow diagram of processing a Message Origination (MO) call during SMS sending according to a first embodiment of the present invention. Although FIG. 2A and FIG. 2B form one drawing, they are separated for convenience' sake.

In step 214, a UE 200 or an SMS originating UE sends an RRC connection request message to an eNB 202 to request an RRC connection. In step 216, the eNB 202 sends an RRC connection setup message to the UE 200 in response to the RRC connection request message received in step 214.

In step 218, the UE 200 sends an RRC connection complete message. During the sending, the UE 200 includes a service request message in the RRC connection complete message. The service request message includes an indicator 'SMS only' indicating SMS sending-only, a Key Set Indicator (KSI), and MAC. The KSI is information indicating a set of an encryption/decryption key allocated through recent authentication, an encryption/decryption key used for integrity assurance/check, and an integrity assurance/check key, and the MAC is a sort of hash value calculated using an Integrity Key (IK). The KSI and the MAC are terms generally used in the technical field of the present invention, and thus will not described in detail. This service request message is sent to an MME 204 via the eNB 202 using an initial UE message in step 220.

In step 220, the eNB 202 allocates an eNB UE S1AP id, which is a temporary id of a UE and is to be used in an SLAP connection (a temporary id the eNB 202 allocates to identify the UE A 200), and includes it as a parameter of the initial UE message. Upon receiving the initial UE message in step 220, the MME 204 sends an 'initial context setup for signaling' message to the eNB 202, for a UE for SMS exchange, in step 222.

Since no data bearer will be set up between the UE 200 and the eNB 202 in the first embodiment of the present invention, the 'initial context setup for signaling' message to be sent in the initial context setup for signaling, to be performed in step 222 does not include information about data bearers, and the MME 204 sends MME UE S1AP id that the MME 204 allocates as a temporary id of a UE in an S1AP connection (a temporary id the MME 204 temporarily allocates to identify the UE 200) and a Key of eNB (KeNB) necessary for the eNB 202 to set up AS security, using a parameter.

Upon receiving the 'initial context setup for signaling' message that the MME 204 sent in step 222, the eNB 202 sets up only AS security and sets up no radio bearer corresponding to the data bearer. In step 224, the eNB 202 sends an AS security command (SEC MOD CMD) message to the UE 200.

If AS security is successfully set up, the UE 200 having received the AS security mode command in step 224 activates NAS security in step 226, considering that the MME 204 has accepted the service request (SMS only, etc.) of step 218 from the UE 200. In step 228, the UE 200 sends a security mode (SEC MOD) complete message to the eNB 202 in response to step 224. The AS security refers to security between the eNB 202 and the UE 200, and the NAS security refers to security between the UE 200 and the MME 204.

After activating AS security, the eNB 202 transmits the results to the MME 204 using an 'initial context setup complete for signaling' message in step 230.

In step 232, the UE 200 sends an SMS message to the MME 204 using an uplink NAS transport message. In step 234, the MME 204 sends the SMS message to an MSC 206 using uplink unit data. Steps 232 and 234 in FIG. 2 correspond to steps 142 and 144 in FIG. 1.

Upon receiving the SMS message from the MME 204 in step 234, the MSC 206 forwards the received SMS message to an SC 212 via an SMS-IWMSC 210 in step 236. In step 238, the MSC 206 transmits an SMS receipt ACK message informing the UE 200 of the normal reception of the SMS message to the MME 204 through downlink unit data. In step 240, the MME 204 sends the SMS receipt ACK to the UE 200 using a downlink NAS transport message. Steps 238 and 240 correspond to details of step 148 in FIG. 1.

In step 242, the SC 212 sends a delivery report message to the MSC 206 via the SMS-IWMSC 210.

Upon receiving the downlink NAS transport message in step 240, the UE 200 sends an ACK message for indicating its reception of the delivery report message, to the MME 204 using an uplink NAS transport message in step 248. Step 248 corresponds to step 188 in FIG. 1. Through steps 250 and 252, the connection between the MME 204, the eNB 202 and the UE 200 is released.

Figure 3A:
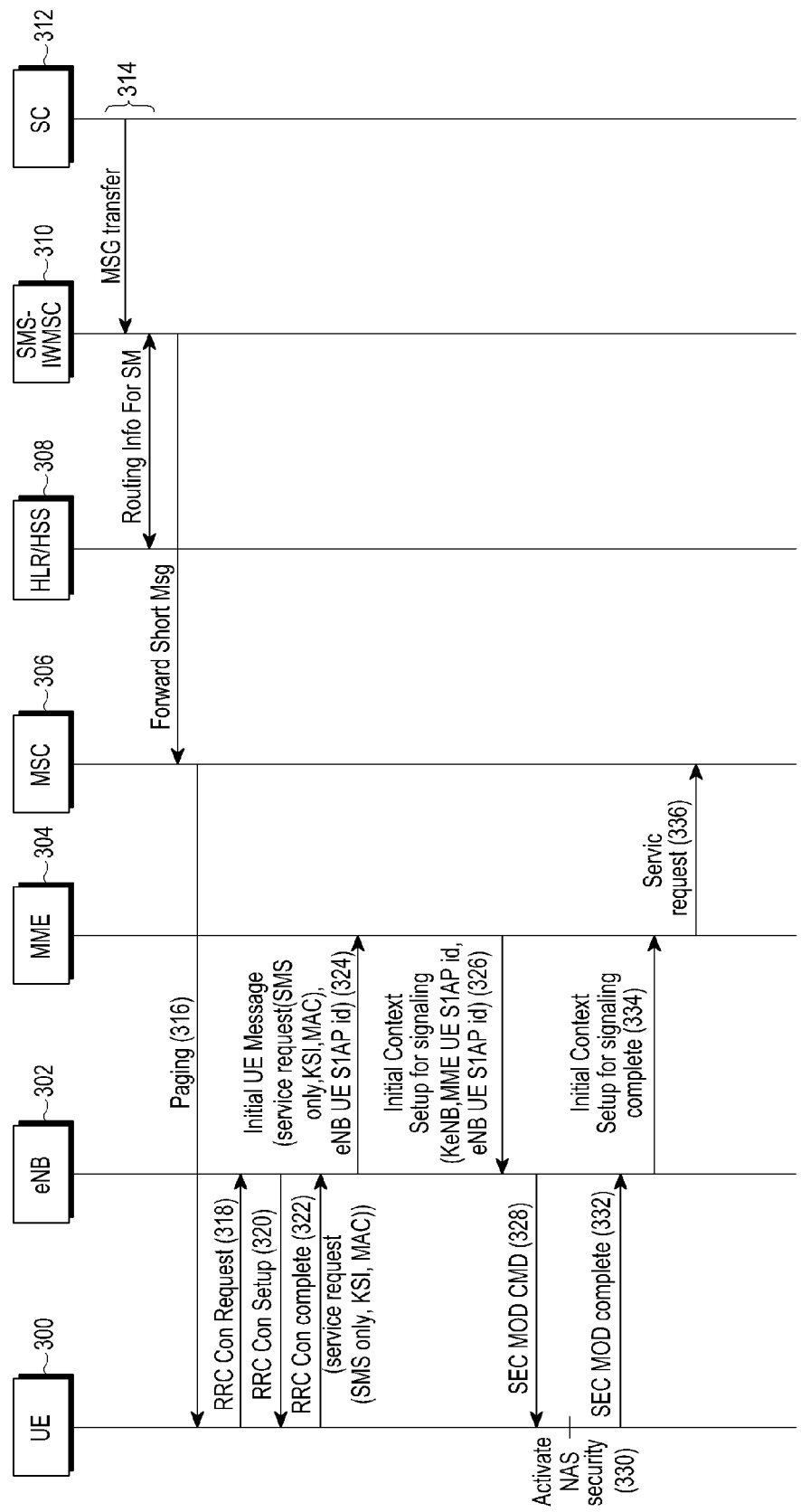
FIG. 3 is a signal flow diagram of processing a Message Termination (MT) call for SMS reception according to the first embodiment of the present invention.
Figure 3B:
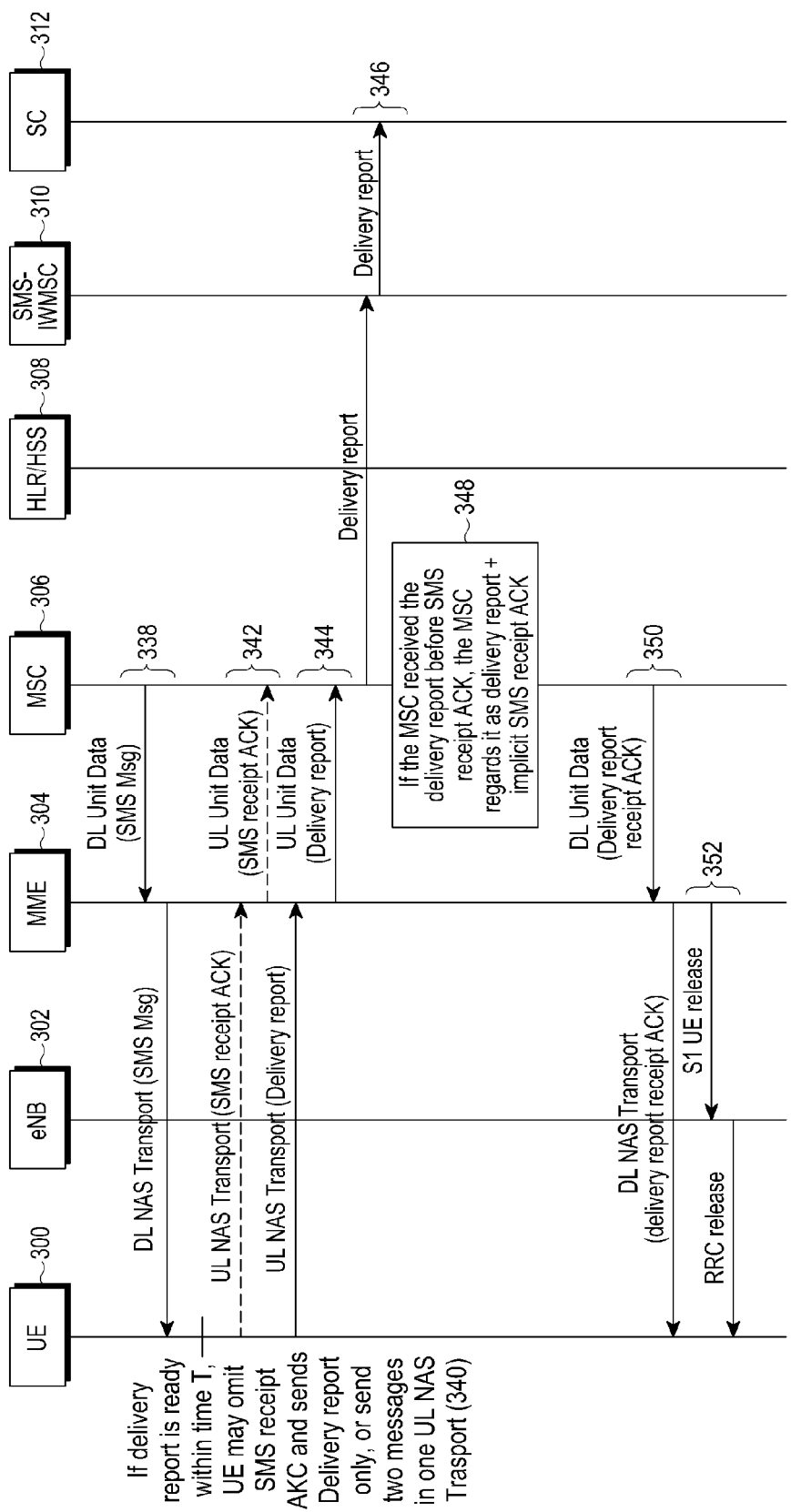

A process of processing a Message Termination (MT) call for SMS reception according to the first embodiment of the present invention will be described below with reference to FIG. 3. FIG. 3 is a signal flow diagram of processing a Message Termination (MT) call for SMS reception according to the first embodiment of the present invention. FIGS. 3A and 3B form one drawing, but they are separated for convenience' sake.

In step 314, an SC 312 forwards an SMS message received from an SMS originating UE to an MSC 306 via an SMS-IWMSC 310 and an HLR/HSS 308. In step 316, the MSC 306 sends a paging message to a UE 300 that is to receive the SMS message.

Upon receiving the paging message, the UE 300 sends an RRC connection request message to an eNB 302 in step 318. In response thereto, the eNB 302 sends an RRC connection setup message to the UE 300 in step 320.

Upon receiving the RRC connection setup message, the UE 300 sends an RRC connection complete message to the eNB 302 in step 322. The RRC connection complete message includes a service request message. The service request message includes an indicator 'SMS only information' indicating that the service request message is only for SMS sending, KSI, and MAC. Upon receiving the service request message, the eNB 302 sends the service request message to an MME 304 using an initial UE message in step 324. In step 324, the eNB 302 allocates an S1AP eNB UE id, which is a temporary id of a UE and is to be used in an S1AP connection, and sends it using a parameter of the initial UE message.

Upon receiving the initial UE message, the MME 304 sends an 'initial context setup for signaling' message to the eNB 302, for a UE for SMS exchange, in step 326. Since no data bearer will be set up between the UE 300 and the eNB 302 in the first embodiment, the 'initial context setup for signaling' message for signaling to be performed in step 326 does not include information about data bearers, and the service request message and an S1AP MME UE id that the MME 304 allocates as a temporary id of a UE in S1AP connection are sent using a parameter.

Upon receiving the 'initial context setup for signaling' message that the MME 304 sent in step 326, the eNB 302 sets up only AS security and sets up no radio bearer corresponding to the data bearer. In step 328, the eNB 302 sends an AS security command (SEC MOD CMD) message to the UE 300. If AS security is successfully set up, the UE 300 having received the AS security command message activates NAS security in step 330, considering that the MME 304 has accepted the service request (SMS only, etc.) for the UE 300. In step 332, the UE 300 sends a security mode (SEC MOD) complete message to the eNB 302 in response to step 328.

After activating AS security, the eNB 302 having received the security mode complete message transmits the results to the MME 304 using an 'initial context setup for signaling complete' message in step 334. In step 336, the MME 304 sends a service request message to the MSC 306 in order to request sending of the SMS message that the MSC 306 received in step 314.

Upon receiving the service request message from the MME 304 in step 336, the MSC 306 forwards the SMS message to the UE 300 via the MME 304 in step 338.

Upon receiving the SMS message in step 338, the UE 300 may send only a delivery report message, omitting SMS receipt ACK message transmission in step 340, if a delivery report transmission time for the received SMS message is less than a preset timer value T. In step 340, the UE 300 may determine whether to send both an SMS receipt ACK message and a delivery report message using one UL NAS transport message.

In step 342, the UE 300 sends an SMS receipt ACK message for indicating the normal reception of an SMS message. However, the UE 300 may omit step 342, if it determines in step 340 to send a delivery report message within a preset timer value.

In step 344, the UE 300 sends a delivery report to the MSC 306 via the MME 304. The SMS receipt ACK message sent in step 342 may be sent together with a delivery report message using a UL NAS transport message that is sent in step 344.

Upon receiving the delivery report message in step 344, the MSC 306 sends the received delivery report message to the SC 312 in step 346.

In step 348, if the MSC 306 receives a delivery report message before receiving an SMS receipt ACK, it considers that the UE 300 has successfully received an SMS message.

In step 350, the MSC 306 sends a delivery report receipt ACK message to the UE 300 via the MME 304. In step 352, the MME 304 and the eNB 302 release their connection with the UE 300.

The process of processing an MT call for SMS reception in the first embodiment of the present invention is different the process of processing an MO call for SMS sending in that the paging reception triggers the service request for the UE 300. In addition, the process of processing an MT call for SMS reception is different from the process of processing an MO call for SMS sending in FIG. 2 in that after receiving the SMS message, the UE 300 sends an ACK for SMS message receipt and a delivery report using one UL NAS transport message, or the UE 300 sends only the delivery report and upon receiving it, the MME 304 may determine that ACK for SMS message receipt is implicitly included.

According to the first embodiment of the present invention, messages sent and received by/at a UE and an eNB are reduced in number by 2 and 4 in total, respectively, as shown in Table 2, compared to Table 1.

TABLE 2

|  | UE | eNB | MME | MSC | SC |
| --- | --- | --- | --- | --- | --- |
| MSG Tx | 5 | 8 | 4 | 3 | 2 |
| MSG Rx | 4 | 8 | 5 | 3 | 2 |

Second Embodiment

A second embodiment of the present invention corresponds to a method in which if a UE sends only SMS messages, no data bearers and no AS securities are set up.

The second embodiment of the present invention is characterized in that the AS securities as well as the data bearers are not set up. If a UE in an idle state intends to send one SMS message, the UE makes an RRC connection, sends one SMS message in a NAS message, and then, immediately releases the RRC connection, so additional RRC messages are not likely to occur. Since the SMS message is protected by NAS security by being sent in a NAS message, the need for AS security setup is low. Therefore, in the second embodiment of the present invention, data bearers are not set up and AS securities are not activated.

Figure 4A:
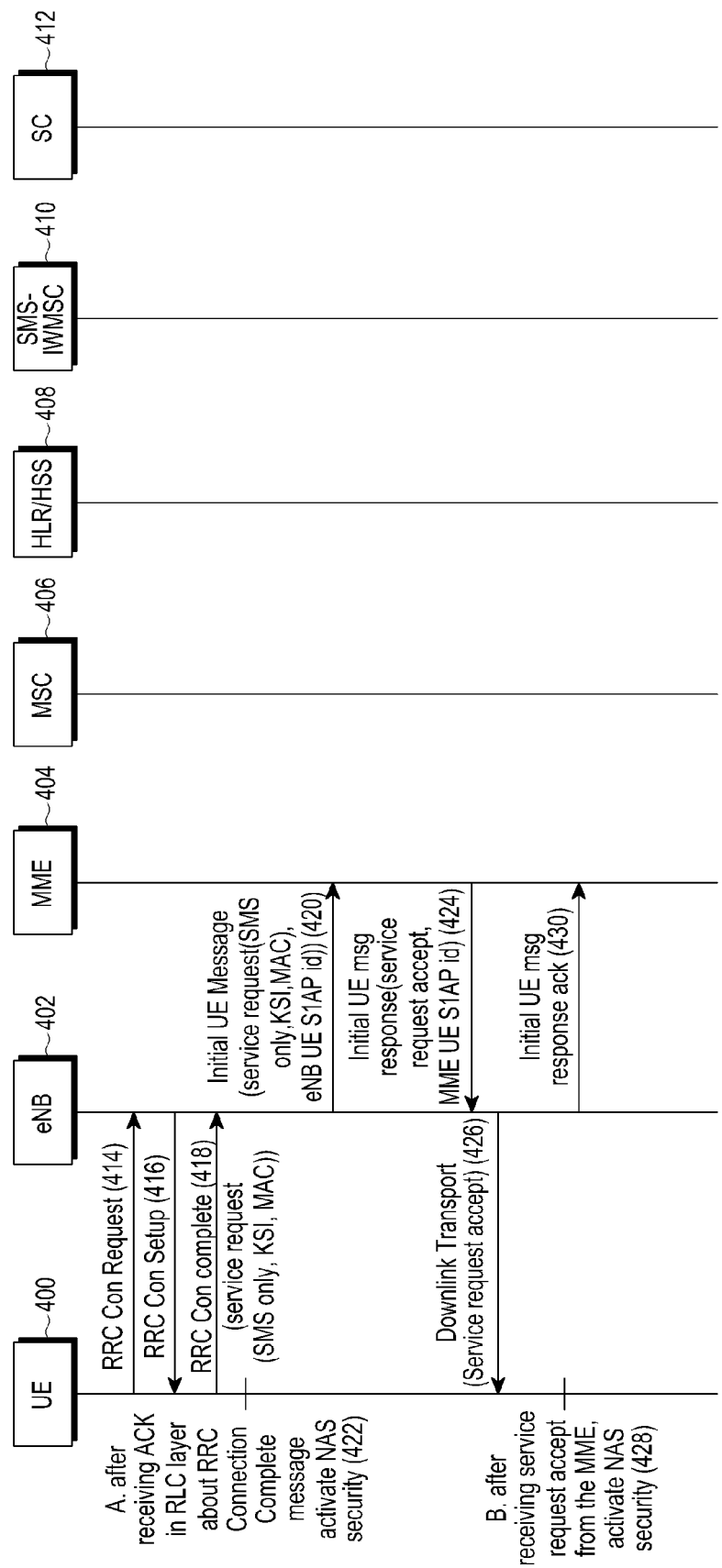
FIG. 4 is a signal flow diagram of processing an MO call during SMS sending according to a second embodiment of the present invention.
Figure 4B:
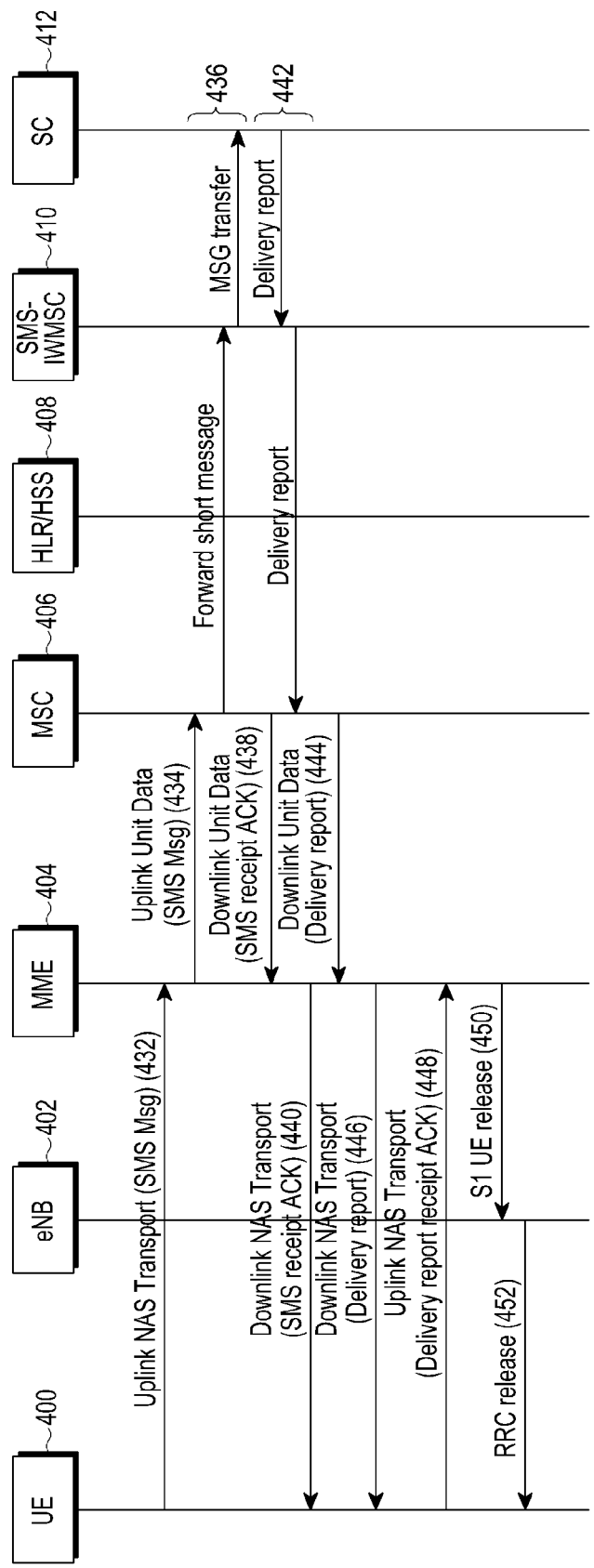

A signal flow diagram of processing an MO call during SMS sending according to a second embodiment of the present invention is as shown in FIG. 4. FIG. 4A and FIG. 4B form one drawing, but they are separated for convenience' sake.

Steps 414 to 420 in FIG. 4 are the same as steps 214 to 220 in FIG. 2, so description thereof will be omitted.

After receiving an initial UE message in step 420, an MME 404 sends to an eNB 402 an initial UE message response that does not include a data bearer context and KeNB 'eNB key' for AS security setup and includes a service accept message for the service request message transmitted in step 418 and an MME UE S1AP id, in step 424. In the second embodiment of the present invention, since data bearer and AS security are not setup, the MME 404 sends the initial UE message response, which does not include a KeNB unlike in the first embodiment of the present invention, to the eNB 402 in step 424.

In step 426, the eNB 402 sends Service request Accept, which is Accept for a service request message that a UE 400 sent, to the UE 400 using a downlink transport message.

In the second embodiment of the present invention, the UE 400 may activate NAS security in any one of steps 422 and 428.

Step 422 represents a case in which the UE 400 performs NAS security activation after checking a response with respect to an RRC connection complete message including a service request message in an RLC layer which is a lower layer of RRC, and step 428 represents a case in which the UE 400 performs NAS security activation after receiving a Service request Accept message that the MME 404 explicitly sent in step 426. In other words, in the second embodiment of the present invention, the UE 400 may perform NAS security activation in step 422 or step 428.

In step 430, the eNB 402 sends an initial UE message response ACK to the MME 404. Steps 432 to 452 are the same as steps 232 to 252, so detailed description thereof will be omitted.

In other words, the process of processing an MO call for SMS sending according to the second embodiment of the present invention is different from the process of processing an MO call for SMS sending according to the first embodiment of the present invention, in the process in which as shown in FIG. 4, after receiving an initial UE message in step 420, the MME 404 sends to the eNB 402 an initial UE message response that does not include a data bearer context and KeNB for AS security setup, in step 424; in the process in which upon receiving the response, the eNB 402 sends an initial UE message ACK message to the MME 404 in step 430; in the process (step 422) in which the UE 400 activates NAS security after checking the success in sending of an RRC connection complete message in RLC which is a lower layer of RRC that sends a service request; or in the process (step 428) in which the UE 400 activates NAS security after receiving the response message with respect to the service request that the MME 404 explicitly sent.

Figure 5A:
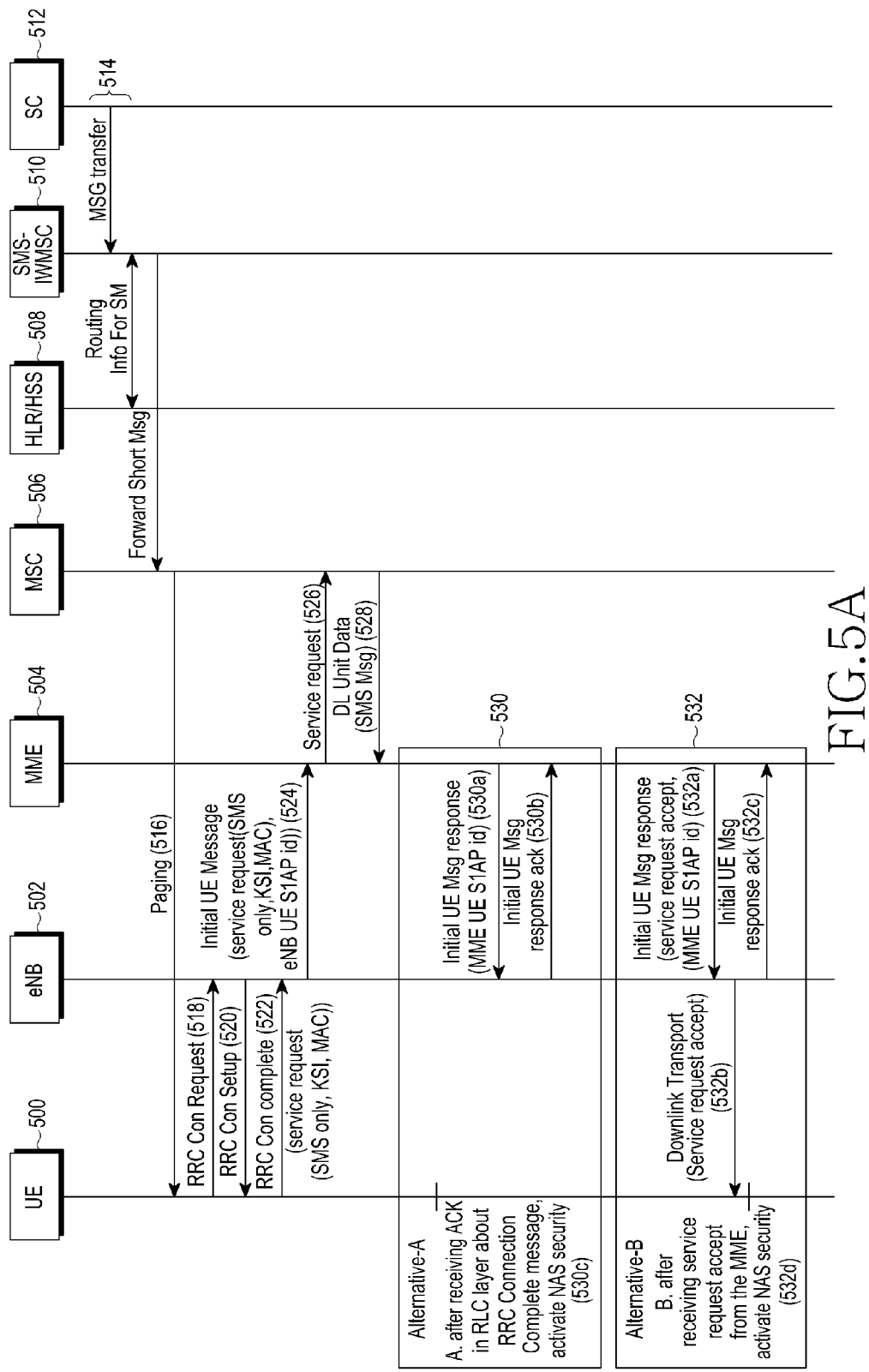
FIG. 5 is a signal flow diagram of processing an MT call for SMS reception according to the second embodiment of the present invention.
Figure 5B:
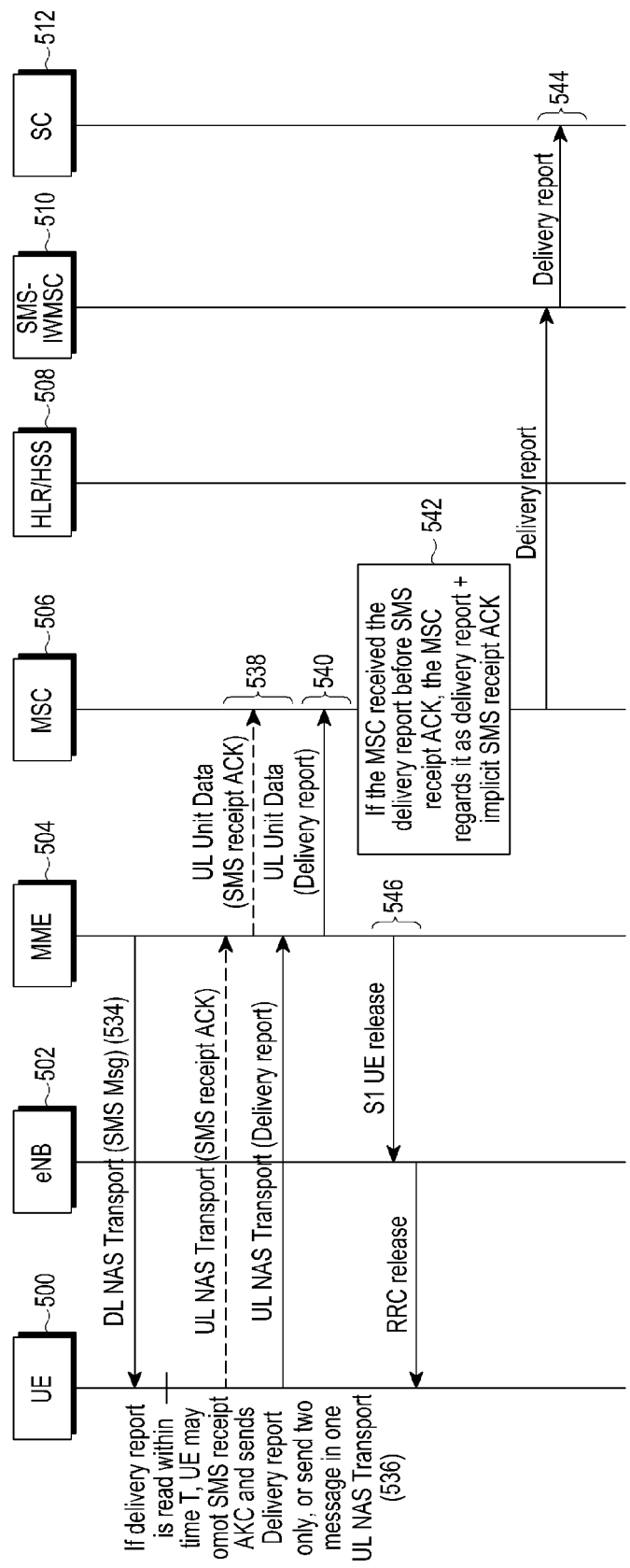

A process of processing an MT call for SMS reception according to the second embodiment of the present invention will be described below with reference to FIG. 5. FIG. 5A and FIG. 5B form one drawing, but they are separated for convenience' sake.

Steps 514 to 524 in FIG. 5 are the same as steps 314 to 324 in FIG. 3, so detailed description thereof will be omitted.

In step 526, an MME 504 sends a service request message to an MSC 506. In step 528, the MSC 506 sends an SMS message received in step 514 to the MME 504 using DL unit data.

In the second embodiment of the present invention, a UE 500 selectively performs step 530 or step 532 depending on the time that NAS security activation is performed. Step 530 shows a case (step 530c) in which NAS security activation for the UE 500 is performed after the UE 500 receives an ACK message from an RLC layer, for the RRC connection complete message, and step 532 shows a case (step 532d) in which NAS security activation for the UE 500 is performed after the UE 500 receives a service request accept message from the MME 504.

The procedure performed in step 530 will be described in detail. In step 530a, the MME 504 sends an initial UE message response message to an eNB 502, and in response thereto, the eNB 502 sends an initial UE message response ACK message to the MME 504 in step 530b. In step 530c, the UE 500 performs NAS security activation.

The procedure performed in step 532 will be described in detail. In step 532a, the MME 504 sends an initial UE message response message to the eNB 502. In step 532b, the eNB 502 sends a downlink transport message including a service request accept message, to the UE 500. In step 532c, the eNB 502 sends an initial UE message response ACK message to the MME 504 in response to step 532a. In step 532d, the UE 500 performs NAS security activation.

In step 534, the MME 504 forwards the SMS message received in step 528 to the UE 500 using a DL NAS transport message, and the UE 500 performs step 536. Step 536 is the same as step 340 in FIG. 3, step 538 is the same as step 342 in FIG. 3, and step 540 is the same as step 344 in FIG. 3, so detailed description thereof will be omitted.

In addition, steps 542, 544 and 546 in FIG. 5 are the same as steps 348, 346 and 352 in FIG. 3, respectively, so detailed description thereof will be omitted.

As described above, like the process of processing an MO call for SMS sending according to the second embodiment, the process of processing an MT call for SMS sending according to the second embodiment of the present invention is characterized in that the eNB 502 and the MME 504 exchange an initial UE message response message that does not include a data bearer context and KeNB for AS security setup, and an initial UE message ACK message, and NAS security activation for the UE 500 may be performed in any one of steps 530c and 532b. According to the second embodiment of the present invention, the messages sent and received by/at a UE and an eNB are reduced in number by 3 and 6 in total, respectively, as shown in Table 3, compared to Table 1.

TABLE 3

|  | UE | eNB | MME | MSC | SC |
|---|---|---|---|---|---|
| MSG Tx | 4 | 8 (7*) | 4 | 3 | 2 |
| MSG Rx | 4 (3*) | 7 | 5 | 3 | 2 |

In Table 3, (number*) represents a case where service accept is not used and NAS security is activated by ACK from RLC.

Third Embodiment

A third embodiment of the present invention corresponds to a method in which if a UE sends only SMS messages, NAS security is activated before sending of a service request message and an SMS message is sent in a service request message.

In the third embodiment of the present invention, a radio bearer for signaling is allocated when an eNB 602 sends an RRC connection setup message after a UE 600 sends an RRC connection request message to the eNB 602. Thus, thereafter, a NAS message may be send using the allocated radio bearer. In other words, the service request message is sent on a dedicated radio bearer allocated to a UE, so that unlike when a common signaling channel is shared, an SMS message, for which the limit in message size is a maximum of 160 bytes, may be included in the service request message. Therefore, the third embodiment of the present invention provides a method of sending an SMS message in a service request message and a service request accept message as in FIGS. 6 and 7.

A process of processing an MO call during SMS sending according to a third embodiment of the present invention will be described below with reference to FIG. 6. FIGS. 6A and 6B form one drawing, but they are separated for convenience' sake.

Steps 614 and 616 are the same as steps 214 and 216 in FIG. 2, respectively, so detailed description thereof will be omitted. After receiving an RRC connection setup message from the eNB 602 in step 616, the UE 600 activates NAS security before sending a service request message, in step 616. In step 620, the UE 600 encrypts the SMS message using a security key, which is an encryption key, in the activated security context, includes it in a service request message, and sends the service request message to the eNB 602 using an RRC connection complete message. The service request message may include an indicator 'SMS only' indicating that the service request message is only for SMS sending, KSI, MAC, the encrypted SMS message (enc(SMS msg)), and flag information indicating that the SMS message has been encrypted (enc fig). In step 620, the UE 600 sends only a MAC for integrity check in the service request message without encrypting the service request message itself in the existing manner.

Figure 6A:
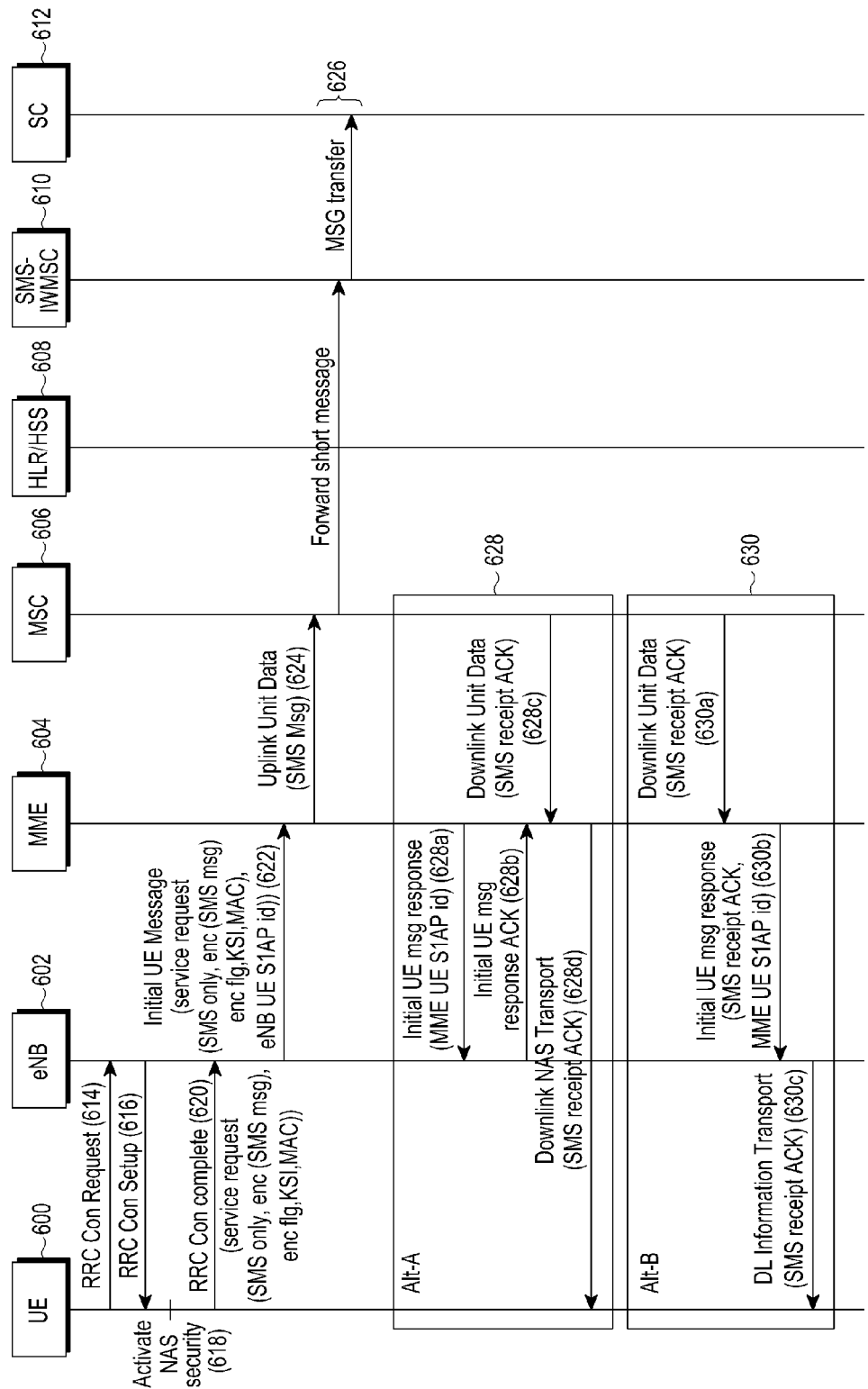
FIG. 6 is a signal flow diagram of processing an MO call during SMS sending according to a third embodiment of the present invention.
Figure 6B:
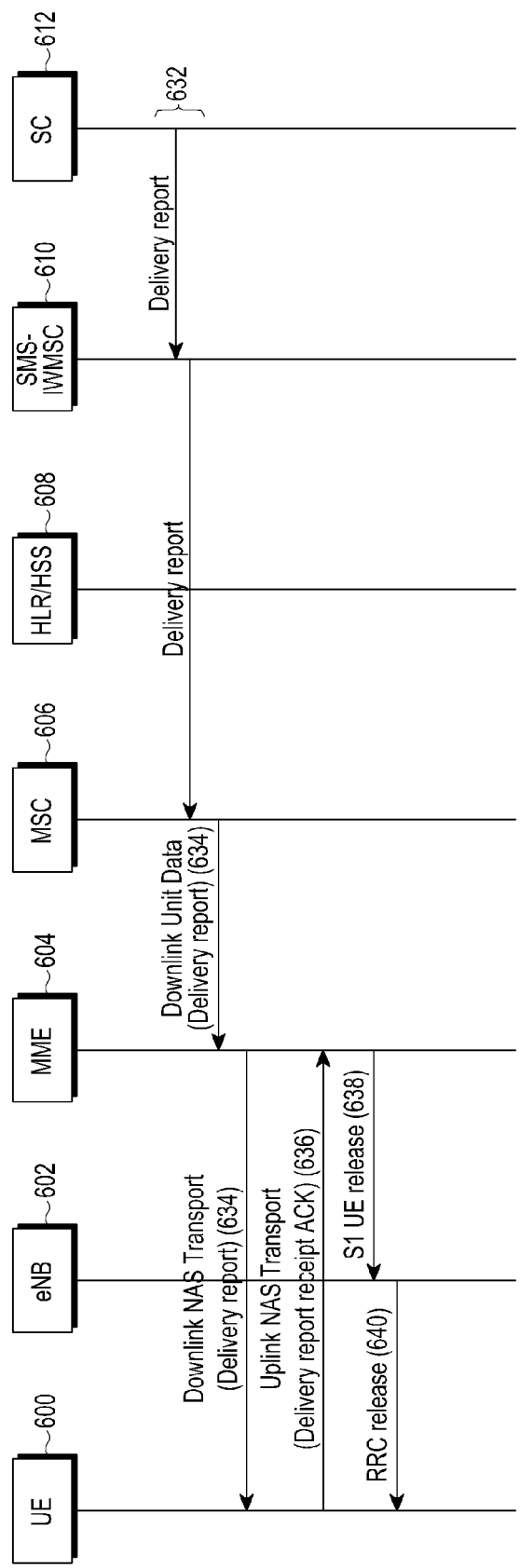

While only the SMS message has been encrypted and sent in step 620 of FIG. 6A, according to another variation, the service request message including the SMS message as well as the SMS message are encrypted and then the MAC may be delivered to the MME 604 together with the encrypted service request message. In this case, the MME 604 performs verification with respect to the MAC and upon completion of verification with respect to the MAC, the encrypted service request message is decrypted using a previously stored security context to extract the SMS message included in the service request message and send the extracted SMS message to the MSC 606.

Upon receiving the RRC connection complete message including the service request message in step 620, the eNB 602 sends an initial UE message including the service request message and the eNB UE S1AP id to an MME 604 in step 622. Upon receiving the initial UE message in step 622, the MME 604 performs integrity check using a MAC code included in the service request message, and if its validity is identified, the MME 604 activates the security context. The MME 604 then decrypts the SMS message included in the service request message using the security key (encryption key) included in the security context, and then sends the decrypted SMS message to the MSC 606 in step 624. Step 626 is the same as step 236 in FIG. 2, so its detailed description will be omitted.

In the third embodiment of the present invention, for the process after the MME 604 sends an SMS message to an MSC 606, two kinds of steps 628 and 630 are possible.

Step 628 "Alternative A" corresponds to a case where the MME 604 independently handles the SMS receipt ACK message and the initial UE message. In other words, the MME 604 sends an initial UE message response message to the eNB 602 in step 628a after receiving the initial UE message including a service request message in step 622, and receives an initial UE message response ACK message from the eNB 602 in step 628b. The MME 604 sends an SMS receipt ACK message that the MSC 606 sent in step 628c, to the UE 600 in step 628d, after sending the SMS message included in the service request message to the MSC 606 in step 624.

As such, in FIG. 6, the initial UE message response and the SMS receipt response may be separately handled or they may be handled at the same time.

However, step 630 "Alternative B" corresponds to a case where the MME 604 handles the SMS receipt ACK message and the initial UE message together. In other words, after receiving the initial UE message including a service request message from the eNB 602 in step 622, a procedure after sending the SMS message in the service request message to the MSC 606 in step 624 is different from step 628. That is, upon receiving an SMS receipt ACK message from the MSC 606 in step 630a, the MME 604 sends the received SMS receipt ACK message to the eNB 602 along with an initial UE message response message in step 630b. In step 630c, the eNB 602 sends the SMS receipt ACK message to the UE 600 using a DL information transport message.

Steps 632 to 640 are the same as steps 242 to 252 in FIG. 2, so detailed description thereof will be omitted.

A process of processing an MT call for SMS reception according to the third embodiment of the present invention will be described with reference to FIG. 7.

Figure 7A:
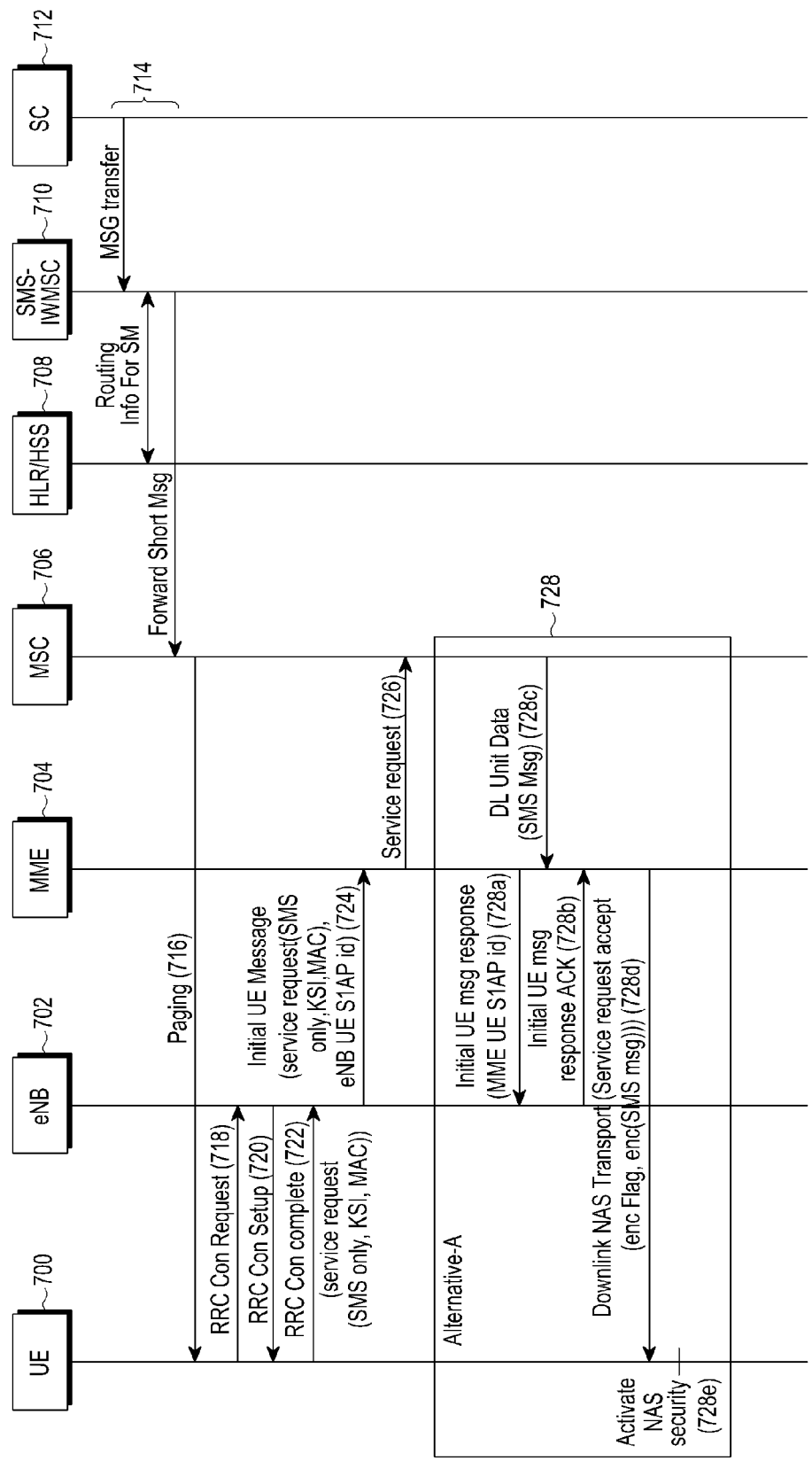
FIG. 7 is a signal flow diagram of processing an MT call for SMS reception according to the third embodiment of the present invention.
Figure 7B:
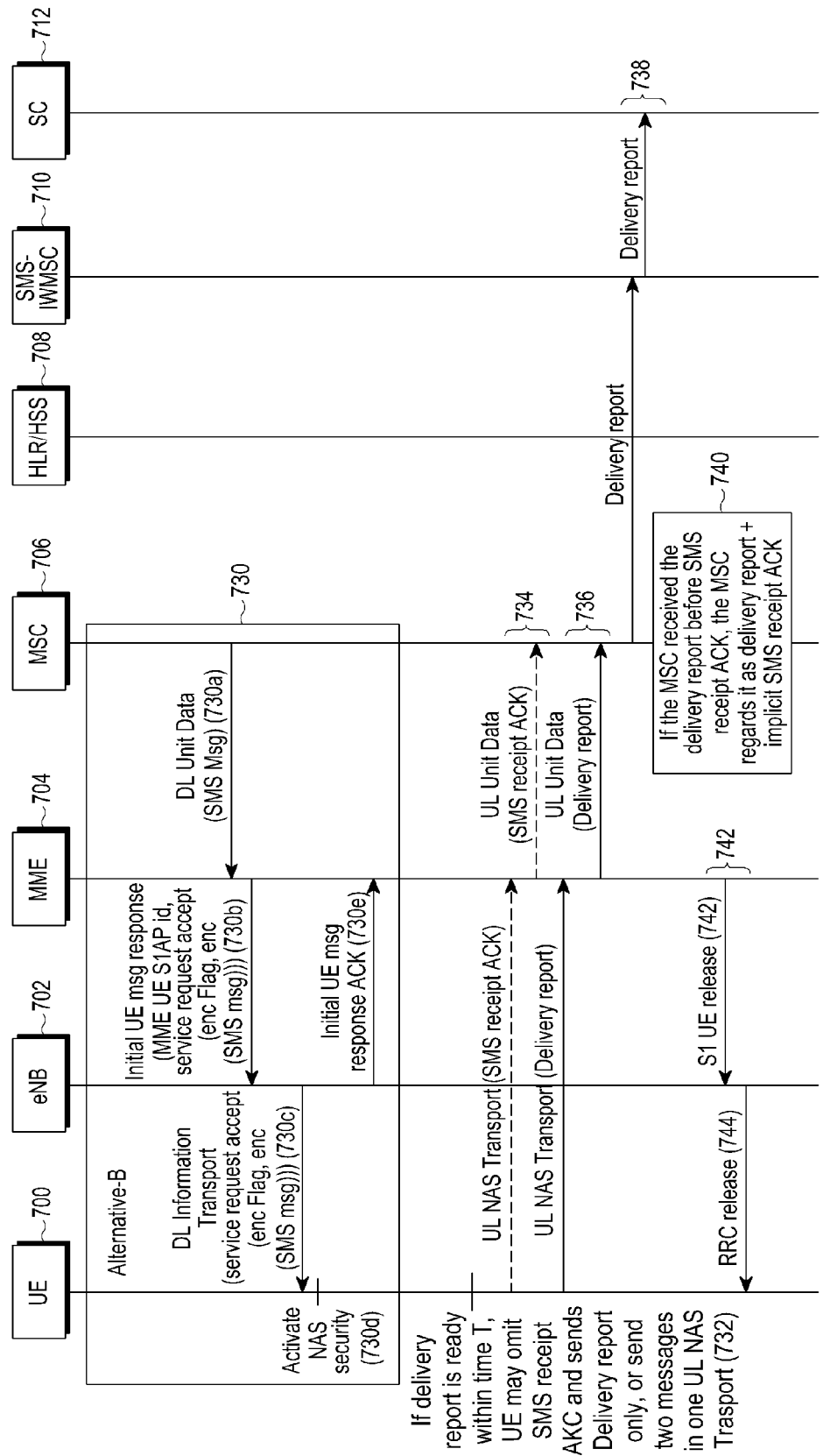

FIG. 7 is a signal flow diagram of processing an MT call for SMS reception according to the third embodiment of the present invention. FIGS. 7A and 7B form one drawing, but they are separated for convenience' sake.

Steps 714 to 726 are the same as steps 514 to 526 in FIG. 5, so detailed description thereof will be omitted.

Any one of steps 728 and 730 may be performed depending on whether an MME 704 independently handles the initial UE message or handles it along with the SMS message in the process of processing an MT call for SMS reception in the third embodiment of the present invention.

The procedure performed in step 728 will be described in detail. In step 728a, the MME 704 sends a response to an initial UE message received in step 724, to an eNB 702. In step 728b, the eNB 702 sends to the MME 704 an ACK message indicating that it has received the initial UE message response message in step 728a.

In step 728c, an MSC 706 sends the SMS message it received in step 714, to the MME 704. In step 728d, the MME 704 sends, to a UE 700, a service request accept message with an SMS message and a flag encFlag indicating the inclusion of an encrypted SMS message, using a downlink NAS transport message.

Upon receiving the downlink NAS transport message, the UE 700 checks the encFlag, and activates NAS security in step 728e. Thereafter, the UE 700 decrypts the encrypted SMS message that was sent together with the service request accept message using an encryption key in the activated NAS security context.

Next, the procedure performed in step 730 will be described in detail. In step 730a, the MSC 706 sends the SMS message received in step 714 to the MME 704. In step 730b, the MME 704 sends to the eNB 702 a response to the initial UE message it received in step 724. Upon receiving the initial UE message response in step 730b, the eNB 702 sends a service request accept message with an SMS message and a flag enc Flag indicating the inclusion of an encrypted SMS message, to the UE 700 using a downlink NAS transport message in step 730c.

On the other hand, as another variation of steps 730b and 730c, if the MME 704 encrypts an SMS message and a service request message including the SMS message instead of encrypting only the SMS message, and adds an MAC for transmission to the UE 700, then the UE 700 having received the encrypted message first performs verification with respect to the MAC and, upon completion of verification with respect to the MAC, decrypts the service request message including the SMS message by using a previously stored security context and extracts the SMS message included in the service request message.

Upon receiving the downlink NAS transport message, the UE 700 checks the enc Flag and activates NAS security in step 730d. Thereafter, the UE 700 decrypts the encrypted SMS message that was sent together with the service request accept message, using an encryption key in the activated NAS security context. In step 730e, the eNB 702 sends to the MME 704 an ACK indicating that it has received the initial UE message response message in step 730b.

Steps 732 to 736 in FIG. 7 are the same as steps 536 to 540 in FIG. 5, so detailed description thereof will be omitted. Further, steps 738, 740 and 742 in FIG. 7 are the same as steps 544, 542 and 546 in FIG. 5, so detailed description thereof will be omitted.

Although it is assumed that NAS security is activated in any one of steps 728 and 730 in the process of processing an MT call for SMS reception according to the third embodiment of the present invention, NAS security may be activated in between steps 720 and 722 if the UE 700 may determine that it receives only the SMS service over Circuit Switched (CS) service, based on the paging message it received in step 716.

The processing of an MT call according to the third embodiment of the present invention, like the processing of an MO call, sends the SMS message using initial UE message response message. Receiving a paging for SMS message reception, sending a service request message according thereto, and activating NAS security in the third embodiment of the present invention are the same as those in the second embodiment of the present invention.

However, the third embodiment is different from the second embodiment in that after sending an RRC connection complete message in step 722, the UE 700 receives the service request accept message with an SMS message from the eNB 702 in step 728d or 730c, checks encFlag indicating the inclusion of the encrypted SMS message, activates NAS security in step 728e or 730d, and then decrypts the encrypted SMS message that was sent together with the service request accept message, using the encryption key in the activated NAS security context. Like the MO call processing, the MME 704 may handle the initial UE message together with the SMS message as in Alternative-A (step 728), or may handle them independently as in Alternative-B (step 730).

According to the third embodiment of the present invention, the messages sent and received by/at a UE and an eNB are reduced in number by 5 and 6, respectively, i.e., by 11 in total, as shown in Table 4 below, compared to Table 1.

TABLE 4

|  | UE | eNB | MME | MSC | SC |
|---|---|---|---|---|---|
| MSG Tx | 3 | 6 (5*) | 4 | 3 | 2 |
| MSG Rx | 3 | 6 (5*) | 5 | 3 | 2 |

In table 4, (number*) represents the number of control messages in alternative-B.

The invention claimed is:

1. A method for delivering data in a mobile communication system, method comprising:
   sending, by an originating User Equipment (UE), to an evolved Node-B (eNB) a service request message for requesting data sending in a process of setting up a Radio Resource Control (RRC) connection using a RRC connection complete message;
   sending, by the eNB, the received service request message to a Mobile Management Entity (MME) using an initial UE message;
   sending, by the MME, an initial context setup for signaling message that does not include information about data bearers, to the eNB in response to the initial UE message;
   upon receiving the initial context setup for signaling message, setting up, by the eNB, Access Stratum (AS) security with the originating UE;

if the AS security is set up, performing, by the originating UE, a Non Access Stratum (NAS) security process with the MME; and upon completion of the NAS security process with the MME, transmitting, by the originating UE, the data to the MME using an uplink NAS transport message.

2. The method of claim 1, wherein the service request message comprises information indicating data-sending only, a Key Set Identifier (KSI), and a Message Authentication Code (MAC).

3. The method of claim 2, wherein the initial UE message comprises the service request message and a temporary identifier which the eNB allocates to identify the originating UE.

4. The method of claim 1, wherein the initial context setup for signaling message comprises a Key of eNB (KeNB) for setting up the AS security between the eNB and the originating UE and a temporary identifier which the MME temporarily allocates to identify the originating UE in an S1 Application Protocol (AP) connection.

5. The method of claim 1, wherein the eNB having received the initial context setup for signaling message sets up no data bearer with the originating UE.

6. A system for delivering data in a mobile communication system, system comprising:

an originating User Equipment (UE) configured to send, to an evolved Node-B (eNB), a service request message for requesting data sending in a process of setting up a Radio Resource Control (RRC) connection using a RRC connection complete message;

the eNB configured to send the service request message included in the RRC connection complete message using an initial UE message, if the RRC connection complete message is received when setting up the RRC connection with the originating UE; and a Mobile Management Entity (MME) configured to send an initial context setup for signaling message that does not include information about data bearers to the eNB, if the initial UE message is received from the eNB, wherein, if the initial context setup for signaling message is received by the eNB, the eNB sets up Access Stratum (AS) security with the originating UE, wherein, if the AS security is set up, the originating UE performs a Non Access Stratum (NAS) security process with the MME, and wherein, upon completion of the NAS security process with the MME, the originating UE sends the data to the MME using an uplink NAS transport message.

7. The system of claim 6, wherein the service request message comprises information indicating data-sending only, a Key Set Identifier (KSI), and a Message Authentication Code (MAC).

8. The system of claim 7, wherein the initial UE message comprises the service request message and a temporary identifier which the eNB allocates to identify the originating UE.

9. The system of claim 6, wherein the initial context setup for signaling message comprises a Key of eNB (KeNB) for setting up the AS security between the eNB and the originating UE and a temporary identifier which the MME temporarily allocates to identify the originating UE in an S1 Application Protocol (AP) connection.

10. The system of claim 6, wherein the eNB having received the initial context setup for signaling message is further configured to set up no data bearer with the originating UE.

* * * * *